United States Patent [19]
Brock et al.

[11] Patent Number: 5,683,120
[45] Date of Patent: Nov. 4, 1997

[54] RELEASABLE PUSH-TO-CONNECT TUBE FITTING

[75] Inventors: David J. Brock; Kimberly J. Gilbert, both of Portage; Lyle E. Parrish, Scotts, all of Mich.

[73] Assignee: Parker-Hannifin Corporation, Cleveland, Ohio

[21] Appl. No.: 656,743

[22] Filed: Jun. 3, 1996

[51] Int. Cl.$^6$ .................................................. F16L 21/06
[52] U.S. Cl. .................... 285/175; 285/308; 285/322; 285/331; 285/918
[58] Field of Search ................................ 285/175, 308, 285/322, 331, 918

[56] References Cited

U.S. PATENT DOCUMENTS

| | | |
|---|---|---|
| 3,214,200 | 10/1965 | Carlson et al. . |
| 3,653,689 | 4/1972 | Sapy et al. . |
| 3,743,326 | 7/1973 | Courtot et al. . |
| 3,884,513 | 5/1975 | Gassert . |
| 3,999,783 | 12/1976 | Legris . |
| 4,005,883 | 2/1977 | Guest . |
| 4,178,023 | 12/1979 | Guest . |
| 4,220,361 | 9/1980 | Brandenberg .................... 285/323 |
| 4,508,369 | 4/1985 | Mode . |
| 4,606,783 | 8/1986 | Guest . |
| 4,621,842 | 11/1986 | Kowal et al. . |
| 4,650,529 | 3/1987 | Guest . |
| 4,685,706 | 8/1987 | Kowal et al. .................... 285/322 |
| 4,722,560 | 2/1988 | Gust . |
| 5,064,223 | 11/1991 | Guest . |
| 5,171,045 | 12/1992 | Pasbrig . |
| 5,230,539 | 7/1993 | Olson .................................. 285/323 |
| 5,474,336 | 12/1995 | Hoff et al. ......................... 285/322 |
| 5,564,757 | 10/1996 | Seabra .............................. 285/322 |
| 5,607,193 | 3/1997 | Guest ............................. 285/322 X |

FOREIGN PATENT DOCUMENTS

| | | |
|---|---|---|
| 278 791 A | 10/1988 | European Pat. Off. . |
| 349344 A | 1/1990 | European Pat. Off. . |
| 364917A | 4/1990 | European Pat. Off. . |
| 7705253 | 11/1977 | Netherlands . |
| 1 602 077 | 11/1981 | United Kingdom . |
| WO 87/05087 | 8/1987 | WIPO . |

OTHER PUBLICATIONS

Drawing dated Aug., 1995 of Parker–Hannifin Corporation for Male Elbow Swivel—Part No. 169PMT–6–4, and Drawing dated May 1995 of Parker–Hannifin Corporation for Sleeve—Part No. 2595–61003.
Literature of Nycoll Poly–matic Instant Fittings.
Literature of SMC Pneumatics, Inc. One Touch Fitting.

(List continued on next page.)

Primary Examiner—Dave W. Arola
Attorney, Agent, or Firm—John A. Molnar

[57] ABSTRACT

A fitting assembly for a releasable connection with a distal tubing end. The fitting includes a generally annular body formed as having an internal bore with a radial surface describing an internal gland having a forward end wall defining a contact edge with the radial surface of the bore. A collet is journalled coaxially within the bore for translational movement within the gland of the body as having a generally cylindrical wall portion expandable to receive the tubing end therethrough. The wall portion is divided longitudinally into at least a pair of arcuate, cantilevered segment extending resiliently between respective distal and proximal ends. Each of the segments has an inner projection disposed adjacent the distal end thereof, and an outer camming portion which extends from a first rearwardly-inclined ramp surface to a generally-contiguous second rearwardly-inclined ramp surface. The collet is slidably moveable within the bore of the body from along a rearward locus accommodating the radial outward movement of the segments resiliently expanding the wall portion for the insertion and removal of the tubing end through the collet member, and first and second forward loci. Along the first and second loci, respectively, the first and second ramp surfaces are disposed in force-transmitting engagement with the contact edge of the body member transferring first and second normal force components to the segment projections gripping the outer surface of the tubing between the segments.

18 Claims, 8 Drawing Sheets

OTHER PUBLICATIONS

Drawing dated Jul., 1995 of Parker–Hannifin Corporation for Male Connector—Part No. 68PL–6–4, and Drawing dated Apr., 1996 for Male Connector—Part No. 68PMT–6–4.

Literature of Weatherhead Push Connect Brass Fittings.

Literature of Camozzi Super Rapid Fittings.

Literature of Mazzer Industries Mazzer–Loc Insta–Brass Fittings.

Literature of Imperial Eastman OmegaFlo Push–to–Connect/Push–to–Release Tube Fittings.

Literature of Legris LF3000 Instant Fitting System.

Literature of Norgren Pneufit Series 12 Push–In Fittings.

Literature of Alkon Push–In Tube Fittings.

Literature of Nihon Pisco for Tubing.

Literature of WEO Hydraulic AB for Couplings.

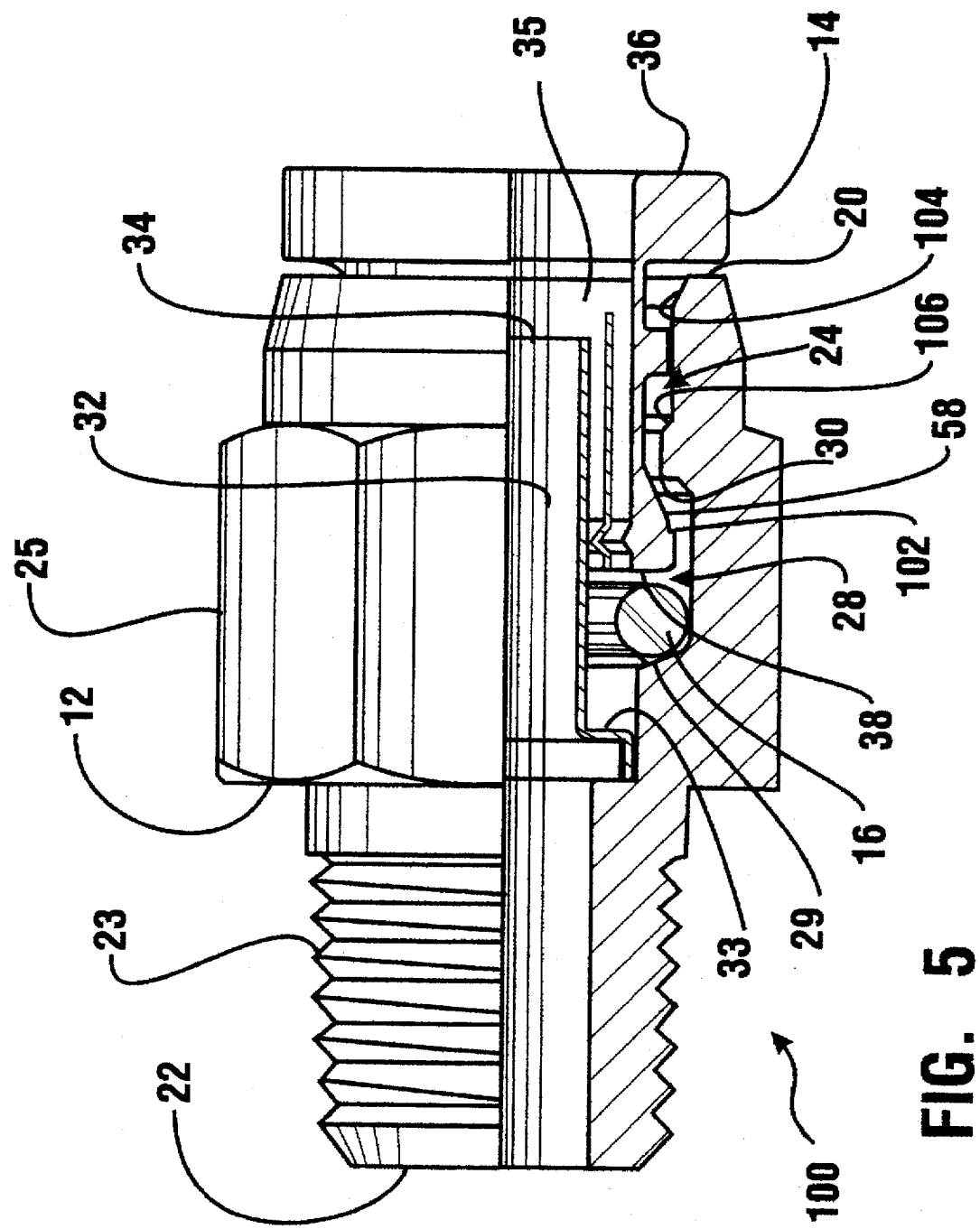

RELEASABLE PUSH-TO-CONNECT TUBE FITTING

BACKGROUND OF THE INVENTION

The present invention relates generally to a releasable, push-to-connect fitting for tubing, and more particularly to a fitting which includes a collet having a dual-ramped surface for an improved gripping of the tubing.

Tube fittings of a manual "push-in" or "push-to-connect" variety are widely employed in a variety of pneumatic, hydraulic, and other fluid transport applications utilizing plastic tubing. For example, metal or polymeric fittings of such type are used as tubing connections in airbrake, suspension, drive train control, and auxiliary air systems for semi-tractors, trailers, and other motor vehicles, as well as in other automotive, marine, and industrial, machinery applications.

In basic construction, these fittings, which may be configured as couplings, connectors, unions, adapters, tees, elbows, or caps, involve a generally annular body having throughbore which extends between a open forward end and, typically, a threaded rearward end. An expandable collet is slidably received within a gland of the open end of the body as extending between an external forward end and an internal rearward end which is formed of a plurality of circumferential, arcuate sections. Each of these resilient segments extends between a forward proximal end and a rearward distal end formed as having a radially outwardly facing shoulder of an enlarged outer diameter and a wedge-shaped, radially inwardly facing grip edge. These grip edges, in turn, are formed by the intersection of a forward and a rearward presenting inclined surface, the forward surface functioning as a camming surface effecting the radially outward expansion of the collet sections allowing for the insertion of a distal tubing end pushed through the collet from the open forward end of the body. A rearwardly-inclined ramp surface typically is operatively associated with the collet shoulders as integrally-formed within the internal surface of the body throughbore or gland at a position forward of the collet segment distal ends, or as separately provided as formed within the internal surface of a retaining ring interposed between the outer circumferential surface of the collet and the inner circumferential surface of the open forward end of the body. An o-ring or other seal member may be interposed between the rearward end of the collet and a forwardly presenting end wall of the body gland for effecting a fluid-tight engagement with the outer wall of the tubing and the inner wall of the body.

For assembly, as the tubing is inserted into the fitting, the distal end of the tubing first is passed through the grip edges of the collet, the segments of which expand to resiliently capture and hold the outer diameter of the tubing, and then through the o-ring which provides a leak-proof seal against the tubing outer wall. The advancement of the tubing into the open end of the fitting is continued until positively stopped by the forwardly presenting end wall of the body gland. Upon the pressurization of the tubing, or as the tubing is pulled or otherwise placed in tension by a generally forwardly directed force, the collet is moved forwardly with the tubing. This movement is delimited, however, by the shoulders of the collet sections being made to abuttingly contact the ramp surface of the body in a force transmitting engagement applying a radially-inwardly directed force to the collet segments and the grip edges thereof. In this way, the grip of the collet is thereby tightened about the outer wall of the tubing preventing the removal of the tubing from the fitting.

For disassembly, the tubing may be released from the fitting by bottoming the tubing against the gland end wall to effect the repositioning of the collet within the body. In such position, the collet segments again may be expanded to release the tubing. In this regard, the external rearward end of the collet may be configured as an annular collar which may pushed axially inwardly for advancing the collet and tubing within the body.

Representative push-in fittings of the type herein involved are described in U.S. Pat. Nos. 3,653,689; 3,999,783; and 4,005,883. Other exemplary fittings are marketed by Mazzer Industries of Rochester, N.Y., under the "Insta-Brass™," by Norgren of Lichfield Staffordshire, England, under the name "Pneufits™," by Alkon of Diadema, Brazil, by Imperial Eastman of Chicago, Ill., under the name "OmegaFlo™," by Camozzi of Brescia, Italy, by Weatherhead of Toledo, Ohio, under the name "Push-Connect™," by Legris Industries of Rennes, France, under the name "LF 3000™," by SMC Pneumatics Inc. of Indianapolis, Ind., under the name "One Touch™," by the Brass Products Division of Parker-Hannifin Corp., Otsego, Mich., under the name "Prestomatic™," and by the Parflex Division of Parker-Hannifin Corp., Ravenna, Ohio, under the name "Tru-Seal™," which fitting is further described in the commonly-assigned copending application U.S. Ser. No. 08/337,651 filed Nov. 22, 1994.

Another fitting of the push-in type includes a grab ring formed of a plurality of resilient fingers for gripping the tubing, and a release sleeve which is slidably interposable between the fingers and the tubing outer wall for releasing the tubing from the fitting. Push-in fittings exemplary of this design include those marketed by the Brass Products Division of Parker-Hannifin Corp. under the name Prestolok, by Nycoil of Fanwood, N.J., under the name "Poly-matic®," and by Pisco Products of Okaya City, Japan.

As facilitating the assembly of fluid systems and obviating the need for tools or special skills to effect the tubing connections, the fittings of the above-described push-in types have represented an important advancement in the field of fluid connectors. However, the use of these fittings in certain applications, such as motor vehicle brake hose or air brake systems, is subject to compliance with certain standards and governmental regulations such as Society of Automotive Engineers (SAE) J1131 entitled, "Performance Requirements for SAE J844 Nonmetallic Tubing and Fitting Assemblies Used in Automotive Air Brake Systems," and Department of Transportation (DOT) Motor Vehicle Safety Standard No. 106-74 for brake hose assemblies and end fittings. The most stringent of the SAE requirements often is considered to be a "hot pull" test wherein a coupled specimen of a push-in fitting and tubing is tensile tested under a specified loading while immersed in boiling water. In order to be considered to be in compliance with the standard, the specimen must exhibit a tubing elongation of 50% or withstand specified loads without separation of the tubing from the fitting.

Moreover, there have been calls from industry for a push-in fitting design having minimal collet travel. As is used in the art, collet travel is defined as the linear distance which the collet moves relative to the body. Although extended collet travel heretofore has been necessary to improve the hot pull performance of conventional fittings, such travel increases the space necessary to install the fitting and otherwise is known to increase the potential for collet damage.

It therefore will be appreciated that improvments in a releasable push-in fitting for plastic tubing would be well-received by industry. A preferred design would be of a simplified construction which reduces collet travel and any potential damage thereto, and which meets both DOT and SAE standards.

SUMMARY OF THE INVENTION

The present invention is directed to a releasable, push-to-connect tube fitting which includes an expandable collet. In providing the collet as having a dual-ramped outer surface which is operatively engagable with an associated internal contact edge of a housing or body member, the fitting of the present invention effects a two-stage gripping of the tubing. The first stage is effective to retain the tubing with the fitting, while the second stage increases the rate of force transfer to grip edges of the collet and delimits the amount of collet travel relative to the body member. Accordingly, the grip force on the tubing is maximized with reduced collet travel.

It therefore is a feature of the present invention to provide a fitting assembly for a releasable connection with a distal tubing end. The fitting includes a generally annular body formed as having an internal bore with a radial surface describing an internal gland having a forward end wall defining a contact edge with the radial surface of the bore. A collet is journalled coaxially within the bore for translational movement within the gland of the body, and has a generally cylindrical wall portion expandable to receive the tubing end therethrough. The wall portion is divided longitudinally into at least a pair of arcuate, cantilevered segment extending resiliently between respective distal and a proximal ends. Each segment has an inner projection disposed adjacent the distal end thereof, and an outer camming portion which extends ends from a first rearwardly-inclined ramp surface to a generally-contiguous second rearwardly-inclined ramped surface. The collet is slidably moveable within the bore of the body from along a rearward locus accommodating the radial outward movement of the segments resiliently expanding the wall portion for the insertion and removal of the tubing end through the collet member and, respectively, first and second forward loci. Along the first locus, the first ramp surface is disposed in force-transmitting engagement with the contact edge of the body member transferring a first normal force component to the collet segment projections at a first predetermined rate effective to grip the outer surface of the tubing between the segments delimiting the removal of the tubing from the fitting assembly. Along the second locus, the second ramp surface is disposed in force-transmitting engagement with the contact edge of the body member transferring a second normal force component to the collet segment projections at a second predetermined rate increased over the first rate and effective to further grip the outer surface of the tubing between the segments.

It is a further feature of the invention to provide a fitting for a releasable connection with a distal tubing end. The fitting includes a generally annular body formed as having an internal bore with a radial surface describing an internal gland having a forward end wall defining a contact edge with the radial surface of the bore. A collet is provided as having a generally cylindrical wall portion expandable to receive the tubing end therethrough. The wall portion is divided longitudinally into at least a pair of arcuate, cantilevered segment extending resiliently between respective distal and a proximal ends. Each of the segments has an inner projection disposed adjacent the distal end thereof, and an outer camming portion which extends ends from a first rearwardly-inclined ramp surface to a generally-contiguous second rearwardly-inclined ramped surface. The collet is disposable coaxially within the bore for slidable movement therewithin from along a rearward locus accommodating the radial outward movement of the segments resiliently expanding the wall portion for the insertion and removal of the tubing end through the collet member and, respectively, first and second forward loci. Along the first locus, the first ramp surface is disposable in force-transmitting engagement with the contact edge of the body member for transferring a first normal force component to the collet segment projections at a first predetermined rate effective to grip the outer surface of the tubing between the segments delimiting the removal of the tubing from the fitting assembly. Along the second locus, the second ramp surface is disposable in force-transmitting engagement with the contact edge of the body member for transferring a second normal force component to the collet segment projections at a second predetermined rate increased over the first rate and effective to further grip the outer surface of the tubing between the segments.

Advantages of the present invention include a push-to-connect coupling construction which meets both SAE and DOT airbrake standards. Additional advantages include a simplified fitting construction which provides for an improved tubing grip with reduced collet travel. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 5 is a partial longitudinal cross-sectional view showing the fitting of FIG. 1 as assembled;

These drawings will be described further in connection with the following Detailed Description of the Invention.

DETAILED DESCRIPTION OF THE INVENTION

For the purposes of the discourse to follow, the precepts of the invention herein involved are described in connection with a push-in fitting assembly particularly adapted for airbrake and other pneumatic applications utilizing plastic tubing having an outer diameter of from about ⅛-inch (3 mm) to ¾-inch (20 mm). It will be appreciated, however, that aspects of the present invention may find utility in other fluid conduit systems, whether for gases or liquids, which utilize tubing of such type. Use within those systems therefore should be considered to be expressly within the scope of the present invention.

Figure 1:
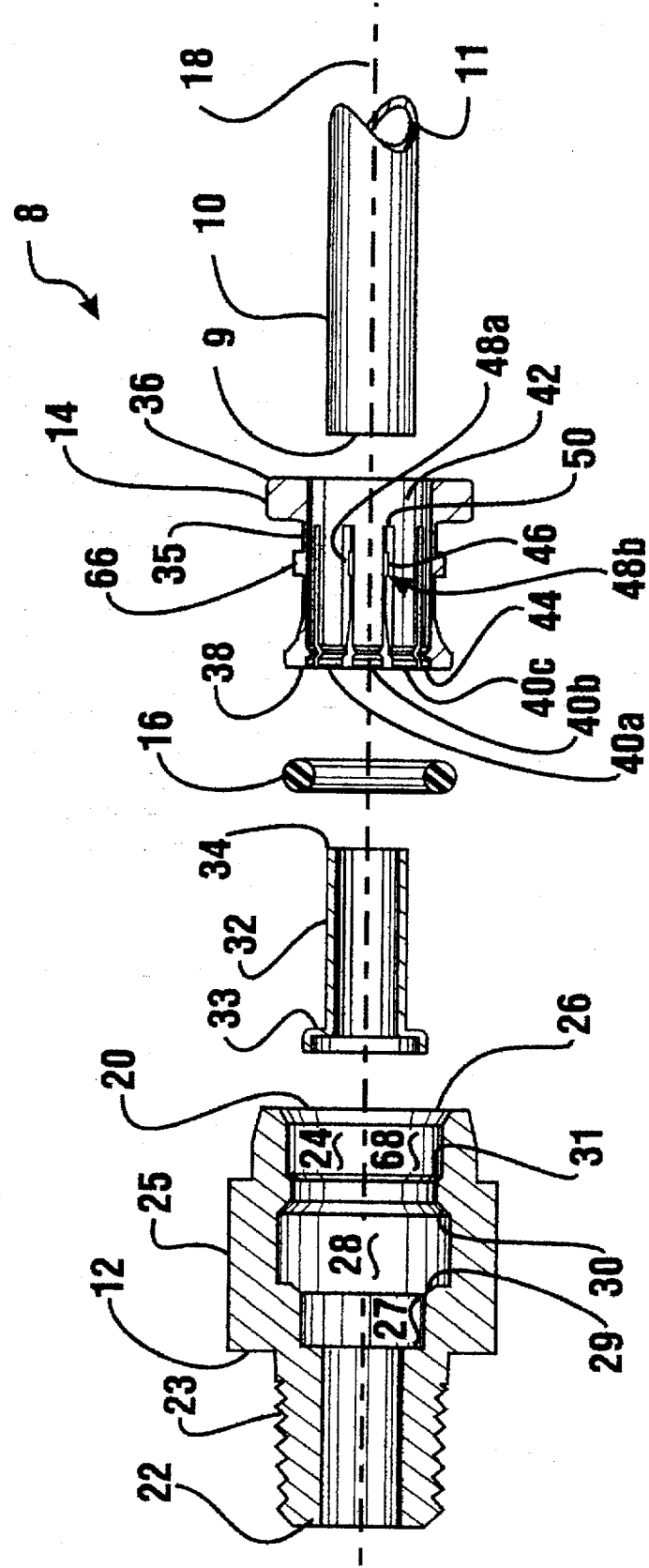
FIG. 1 is an exploded, longitudinal cross-sectional view of a push-to-connect tube fitting in accordance with the present invention which includes an annular body member having an internal contact edge and a segmented collet member receivable coaxially therein.

Referring then to the figures wherein corresponding reference characters are used to designate corresponding elements throughout the several views, shown generally at 8 in the exploded view of FIG. 1 is an embodiment of a push-in tube fitting according to the present invention as adapted for a releasable fluid connection with the distal end, 9, of a length of tubing, 10, having a wall, 11, of given outer diameter. In basic construction, fitting 8 includes a generally tubular, one-piece body member, 12, an annular, one-piece collet member, 14, journalable coaxially within body member 12, and an annular seal member, 16, interposable between body and collet members 12 and 14.

Body member 12 extends axially along a central longitudinal axis, 18, of fitting 8 from an open forward end, 20, to a rearward end, 22. For illustrative purposes, rearward end 22 is shown to be configured as a nipple having external threads, referenced at 23, for coupling with a corresponding fastening member such as a female threaded end of an associated fitting (not shown). In this regard, a radial flange, 25, configured as having hexagonal flat portions may be integrally formed about body member 12 intermediate the forward and rearward ends 20 and 22 thereof for engagement with a wrench or other tool during installation or connection. Other externally-threaded, as well as internally-threaded or unthreaded, embodiments of rearward end 20 may be envisioned, however, depending on the desired configuration of fitting 8 as a coupling connector, union, adapter, tee, elbow, cap, or the like.

Figure 2:
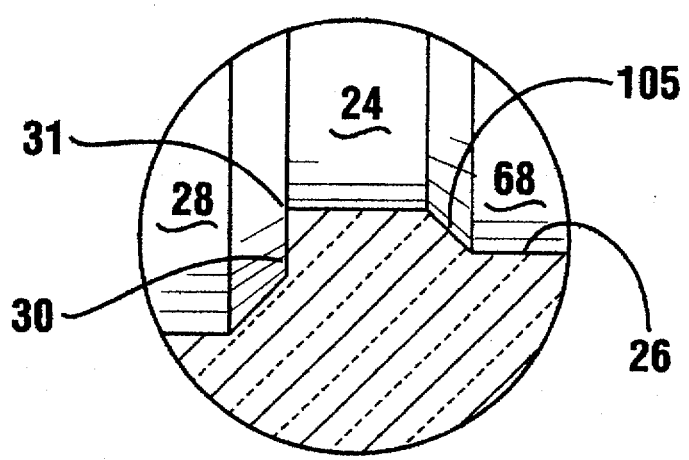
FIG. 2 is an enlarged cross-sectional view showing the internal contact edge of the body member of FIG. 1 in enhanced detail.

Indeed, and irrespective of such second end configuration, body member first end 20 is formed as having a internal bore, such as the throughbore referenced generally at 24, with a radial surface, 26, describing an internal gland shown at 28 to be disposed intermediate body member forward and rearward ends 20 as configured to receive collet member 14. Gland 28, which is of an enlarged diametric extent relative to the balance of bore radial surface 26, is formed as having rearward end wall, 29, and, as may be seen through momentary reference to the enlarged view of FIG. 2, a forward end wall, 30, defining a contact edge, 31, with radial surface 26 of bore 24. For reinforcing the inner diameter of the tubing distal end which is to be received within fitting 8 through bore 24, a generally annular tube support, 32, may be conventionally provided as extending from a rearward proximal end, 33, mounted within a gland 27 of bore 24 as configured to define a rearward tube stop, to a forward proximal end, 34. In this regard, the tubing distal end may be sleeved over tube support 32 for resistance against crushing from radially-inwardly directed compressive forces developed thereon by collet member 14.

Figure 3:
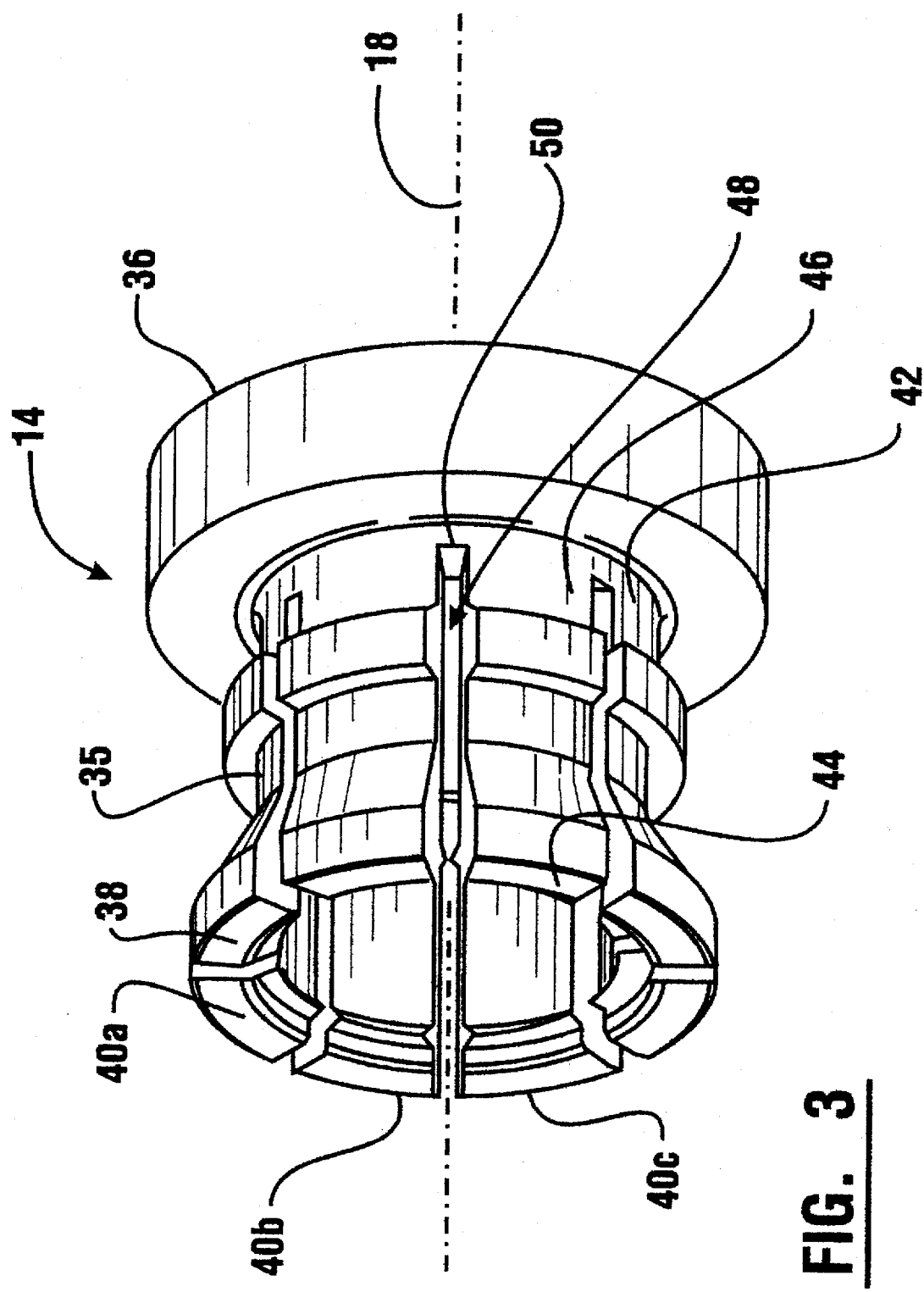
FIG. 3 is a perspective view of the collet member of FIG. 1.

Collet member 14, in turn, is integrally-formed as having a generally cylindrical wall portion, 35, of a given diameter which is resiliently expandable to receive the distal end 9 of tubing 10 therethrough. Wall portion 35 extends axially along central longitudinal axis 18 from between a flanged, forward first end, 36, and a tapered, rearward second end, 38, through which collet member 14 is divided into at least a pair of arcuate segments, three of which are referenced at 40a–c. As is shown for segment 40c, each of segments 40 extends from an annular, circumferentially continuous portion, 42, of collet member 14 between a forward proximal end, 44, disposed intermediate first and second ends 36 and 38 of collet member 14, and a rearward distal end, 46. In the embodiment illustrated, and as may be better appreciated through additional reference to FIG. 3, wall portion 35 is divided into segments 40 by a corresponding number of rebates or slots, two of which are referenced at 48a–b in FIG. 1, each extending through collet member second end 38 to a terminus, referenced at 50 for rebate 48b, intermediate first and second ends 36 and 38 of collet member 14. For symmetry, rebates 48 may be equally spaced-apart radially about longitudinal axis 18 to divide collet member 14 into segments 40 of equal circumferential sectors. The preferred number of segments 40 may vary as generally depending upon the nominal diameter of collet member 14, but typically will be between two and eight.

Figure 4:
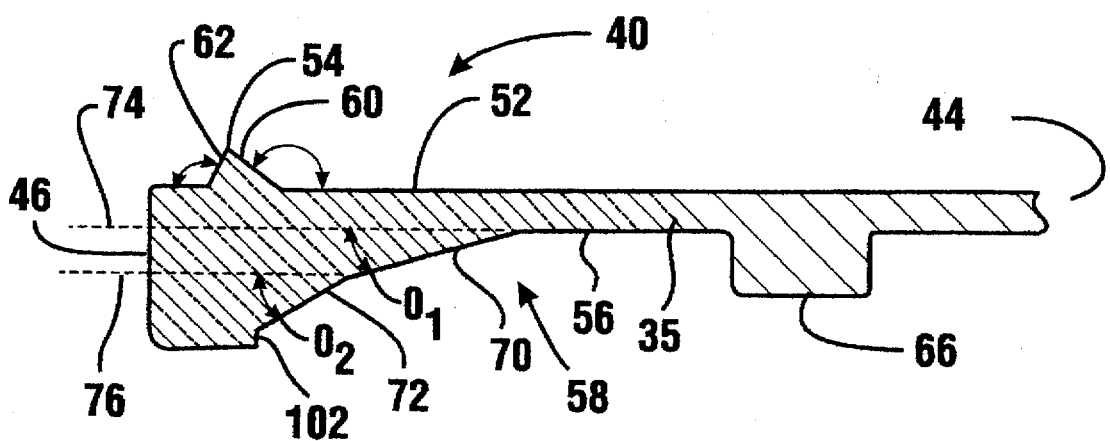
FIG. 4 is an enlarged cross-sectional view showing the distal end of a segment of the collet member of FIG. 1 in enhanced detail.

Looking next to FIG. 4 wherein a distal end 46 of a collet member segment 40 is shown in enhanced detail, each of segments 40 is configured as having an inner surface, 52, defining a radially inwardly extending, wedge-shaped projection or "grip edge," 54, disposed generally adjacent segment distal end 46, and an outer surface, 56, defining a camming portion, shown generally at 58, as extending intermediate segment proximal and distal end 44 and 46. Each of edges 54 is formed by the intersection of a forwardly presenting inclined surface, 60, defining an angle, referenced at $\alpha_1$, of about 150° with inner surface 52, and a rearwardly presently inclined surface, 62, defining an angle referenced at $\alpha_2$, of about 120° with inner surface 52. As is detailed hereinafter in connection with FIG. 6A, forward surface 60 exhibits a camming function with tubing distal end 9 (FIG. 1) effecting a radially outward expansion of collet member wall portion 35 for the insertion of tubing 10 therethrough.

Returning to FIG. 1, it will be appreciated that constructed as described, collet member 14 may be resiliently enlarged by about 5–10% or more from its normal or relaxed inner diameter, to an expanded inner diameter accommodating, respectively, the insertion of tubing distal end 9 and the releasable capture thereof within firing 8. That is, segments 40 are resiliently yieldable or pivotable from their normally-biased or relaxed orientation for radial outward movement relative to central longitudinal axis 18 accommodating the insertion through collet member 14 of tubing distal end 9 having an outer diameter which is marginally larger than the inner diameter of collet member 14. In this regard, collet member 14 may be configured such that segments 40 thereof describe the generally circular arc, shown in FIG. 3, when in their normally biased orientations. However, as it is known that such an arc may result in an imperfect circle when the segments are expanded, the arc alternatively may be configured to have an elliptical geometry such that a more perfect circle is developed upon expansion for a more uniform force distribution about the tubing.

Further in this regard, and as is shown in FIG. 1, each of collet member segments 40 may be formed has having an area of increased cross-sectional thickness forming a generally annular collar portion, 66, intermediate the first and second ends 36 and 38 of collet member 14. The radial thickness and/or location of collar portion 66, which is received within a corresponding gland, shown at 68, formed within body member open forward end 20, may be varied to affect the flexibility of segments 40. Collar portion 66 additionally provides for the positive positioning of collet member 14 coaxially within bore 24 of body member 12.

Looking again additionally to FIG. 4, camming portion 58 may be seen to be configured in accordance with the precepts of the present invention as having a dual-ramped or compound conical surface geometry in extending rearwardly from a first rearwardly-inclined or canted, i.e., forwardly-presenting, conical ramp surface, 70, to a generally-contiguous, second rearwardly-inclined or canted, conical ramp surface, 72. That is, first ramp surface 70 is inclined to define a first acute inclination angle, referenced at $\theta_1$, with the horizontal as represented by the construction line referenced at 74, while second ramp surface defines a second acute angle, referenced at $\theta_2$, with the horizontal as represented by the construction line referenced at 76, which angle is greater than first actuate angle $\theta_1$. For the development of optimum grip forces by collet member 14 about the outer diameter of the tubing, the measure of angle $\theta_2$ should be selected to about twice that of angle $\theta_1$, and, preferably, in range of about 15° or more for angle $\theta_1$ and 30° or more for $\theta_2$, with the lower thresholds of about 15° and 30° having been determined experimentally to be most preferred.

Turning next to FIG. 5, fitting 8 is shown at 100 as assembled with collet member 14 being journalled coaxially within bore 24 of body member forward end 20, and with seal member 16 being disposed coaxially within body member gland 28 as interposed between rearward end wall 29 thereof and collet member second end 38. Seal member 16, which may be of a conventional o-ring configuration and formed of an elastomeric material such as a nitrile, fluorocarbon, silicone, neoprene, or EPDM rubber, or another polymeric material such as a buna or other copolymer, is configured to receive the distal end of the tubing therethrough. Accordingly, seal member 16 is further dimensioned for compression between the outer wall of the tubing and the radial surface of gland 28 effecting a fluid-tight sealing of the fitting assembly 100.

Within assembly 100, rearward end 38 of collet member 14 is received for translational movement within internal gland 28 of body member 12 intermediate seal member 16 and gland forward wall 30. In this regard, camming portion 58 optionally may be configured to further extend rearwardly from second ramp surface 72 to define stop portion, 102. As may be seen with momentary reference to FIG. 4, stop portion 102 is configured as a forwardly presenting, upstanding surface which is abuttingly engageable with contact edge 31 of body member 12 to delimit the forward movement of collet member 14 out of bore 24. In this way, collet member 14 may be positively retained within body member 12 for preventing an accidental or other loss of the collet member prior to use, as well as for ensuring that the collet member is securely held within the body during use. In turn, flanged forward end 36 of collet member 14 provides a positive stop against forward end 20 of body member 12 delimiting the rearward movement of the collet member for preventing its loss within the body member.

With seal member 16 disposed within gland 28, fitting 8 may be assembled simply by advancing the rearward end 38 of collet member 14 into bore 24 through the forward end 20 of body member 12. To facilitate this assembly, the rearwardly-inclined, forwardly presenting ramp surfaces which are referenced at 104 and 106 in FIG. 5, may be provided as formed within the radial circumferential surface 26 of bore 24. Surfaces 104 and 106 confront the rearward end 38 of collet member 14 for collapsing wall portion 35 thereof. Advantageously, the need for a separate retainer or other member to lock the collet member within the body is obviated by virtue of the present design.

Figure 6A:
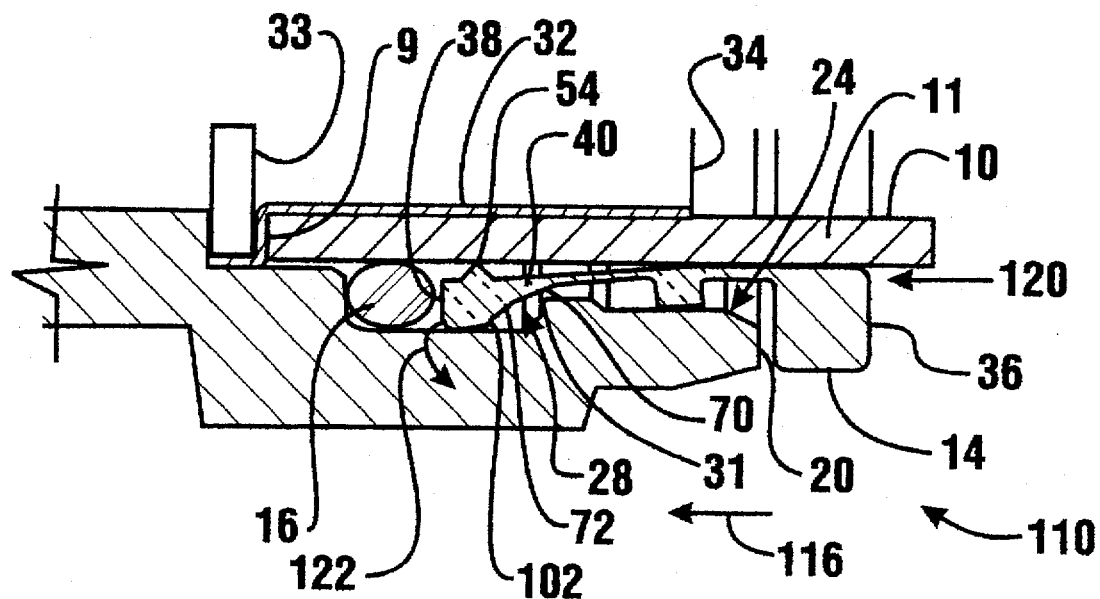
FIG. 6A is an enlarged cross-sectional view showing the assembled fitting of FIG. 5 with the collet member thereof as positioned in a forward orientation allowing for the insertion and removal of a distal tubing end therethrough.

With general reference to FIGS. 6A–6D, the operational sequence of fitting 8 of the present invention next is revealed generally at 110. Referring initially to FIG. 6A, collet member 14 is shown as advanced to its rearward terminus within bore 24 of body member 12. At such terminus, the rearward end 38 of collet member 14 is positioned within gland 28 within a rearward locus accommodating the radial outward movement of collet member segments 40 resiliently expanding wall portion 35 for the insertion of distal end 9 of tubing 10. In this regard, tubing distal end 9 is shown as having been received within bore 24 as sleeved over tube support 32 and advanced coaxially through collet member 14 into abutment with the tube stop defined by the proximal end 33 of the tube support. For airbrake and other pneumatic applications, tubing 10 generally will be provided as having a wall 11 thickness of from about 0.014–0.120 inch (0.35–3 mm), and as formed of a polymeric material. Typically, such material will be selected as a thermoplastic material such as a polyethylene, polypropylene, polyurethane, polyvinyl chloride, nylon or the like having a hardness of from about 60 durometer on the A scale to about 100 durometer on the M scale. For the penetration and gripping of tubing wall 11 by projections 54 of collet member 14, the collet member preferably is formed of a material, such as brass or the like, which is at least about 5 durometer points harder than material forming tubing 10.

Figure 6B:
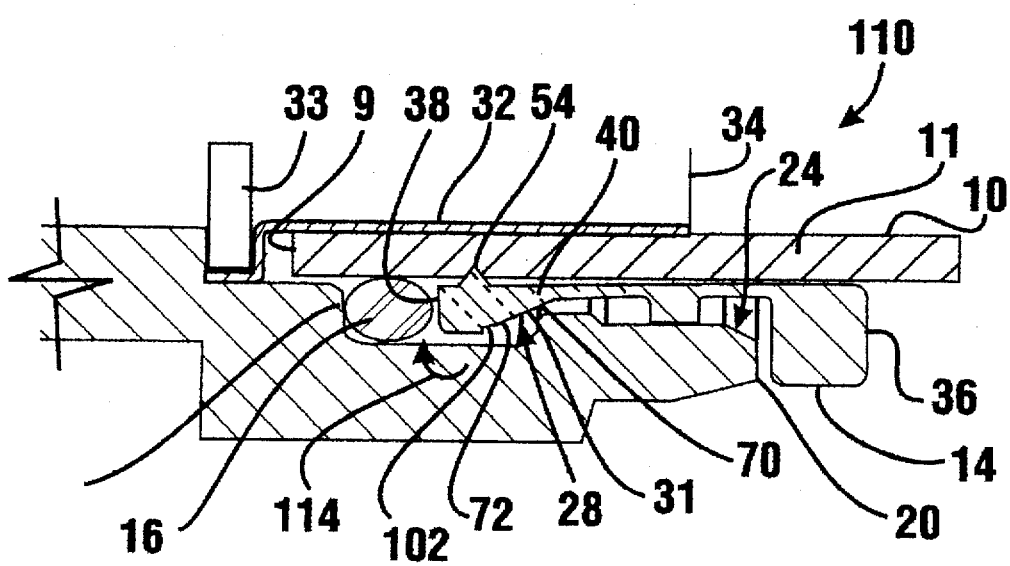
FIG. 6B is an enlarged cross-sectional view as in FIG. 6A showing the collet member as positioned in a first rearward orientation disposing a first ramp surface thereof in an abutting, force-transmitting engagement with a corresponding internal contact edge of the body member.

Continuing with FIG. 6B, collet member 14 is shown as having been slidably moved forwardly in the direction represented by arrow 112 with tubing distal end 9 responsive to the pressurization of tubing 10 increasing the diameter of wall 11, or to the application of a forwardly-directed tensile force pulling tubing distal end 9. With first ramp surface 70 of collet member segments 40 urged into an abutting, force-transmitting engagement with contact edge 31 of body member 12, collet member 14 thereby is positioned along a first forward locus transferring a radially inwardly directed normal force component, represented by arrow 114, to the collet member projections 54. Such force transfer, which effects the tightening of the "grip" or compression of the collet member about the outer diameter of the tubing wall 11 and increased penetration of the projections thereinto, thus delimits the removal of the tubing distal end 9 from the fitting assembly.

Figure 6C:
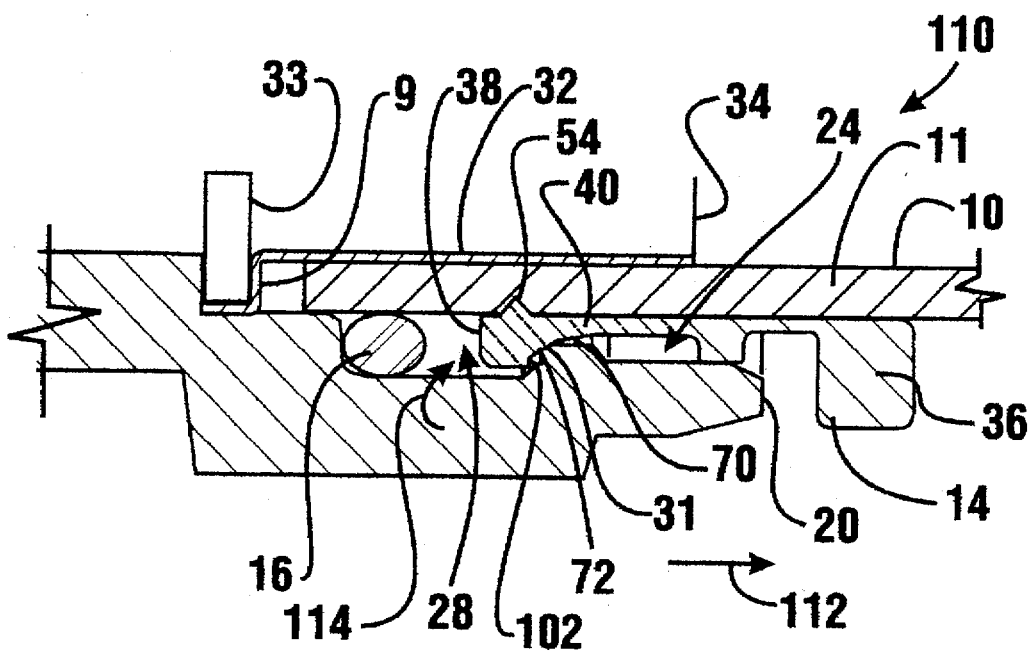
FIG. 6C is an enlarged cross-sectional view as in FIGS. 6A and 6B showing the collet member as positioned in a second rearward orientation disposing a second ramp surface thereof in an abutting, force-transmitting engagement with the internal contact edge of the body member.

Proceeding to FIG. 6C, collet member 14 is shown as having been further forwardly advanced with tubing distal end 9 into a position along a second forward locus operatively disposing second ramp surface 72 in an abutting, force-transmitting engagement with contact edge 31 of body member 12. A second radially inwardly directed normal force component thereby is transferred to the collet member projections 54, further tightening the grip of the collet member about the outer diameter of the tubing wall 11 and further increasing penetration of the projections thereinto. Inasmuch as second acute inclination angle $\theta_2$ (FIG. 4) is greater than that of first inclination angle $\theta_1$, the rate of the second force transfer as second ramp surface 72 is moved along contact edge 31 is increased over that as first ramp surface 70 is moved along the contact edge. In this way, maximum gripping force may be developed on the tubing while minimizing the length of collet travel.

Figure 6D:
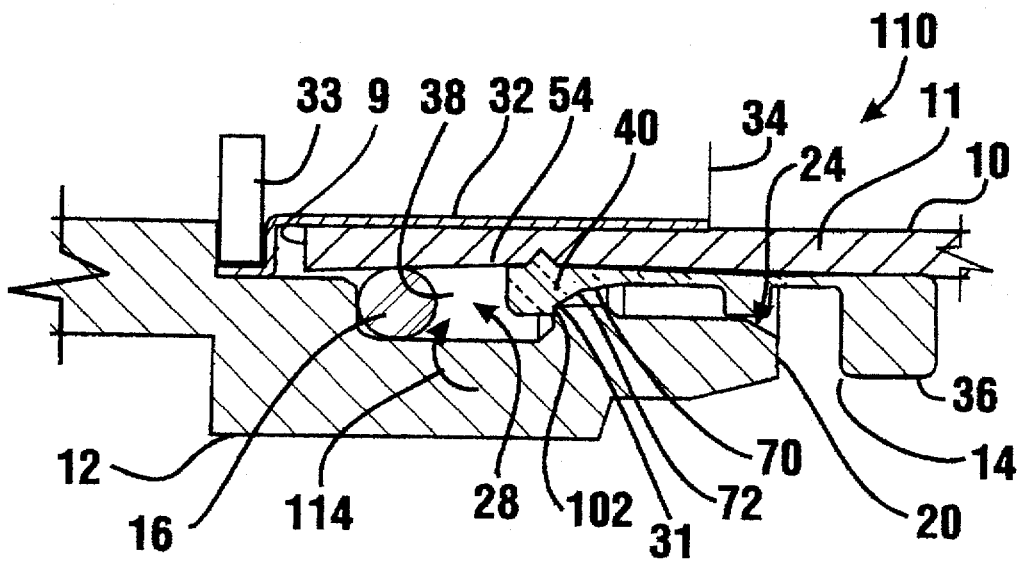
FIG. 6D is an enlarged cross-sectional view as in FIGS. 6A, 6B, and 6C showing the collet member as positioned in a third rearward orientation disposing an upstanding stop portion thereof in an abutting engagement with the internal contact edge of the body member delimiting the further rearward movement of the collet member within the body member.

As is shown in FIG. 6D, the travel of second ramp surface 72 along contact edge 31 is continued with the forward advancement of the tubing 10 to the forward terminus of collet member 14. At such terminus, the upstanding stop surface 102 of collet member forward end 38 is made to abuttingly engage contact edge 31 delimiting the further forward movement of collet member 14 with bore 24 of body member forward end 20. Such engagement contributes to the robustness of the fitting in minimizing the potential for failure from the accidental pull-out of the tubing.

Returning to FIG. 6A, for disconnection, tubing 10 may be released from the fitting by its rearward advancement, as represented by arrow 116, again bottoming distal end 9 thereof against internal stop 33 of tube support 32. Concomitantly effected is the repositioning of collet member 14 at its rearward terminus disposing rearward end 38 thereof within gland 28 again accommodating the radial outward movement of collet member segments 40 resiliently expanding wall portion 35. In this regard, the flanged external rearward end 36 of collet member 14 may be manually advanced axially-inwardly as shown at 120 for returning the collet to the position shown in FIG. 6A. Depending upon the resiliency and relative hardness of the collet member, tubing wall 11 may be somewhat skived by projections 54 as the tubing distal end 9 is removed from within the fitting assembly. For preventing accidental disconnection, a clip of conventional design (not shown) may be interposed between external collet member first end 36 and body member forward end 20 delimiting the rearward movement of the collet member.

Figure 7A:
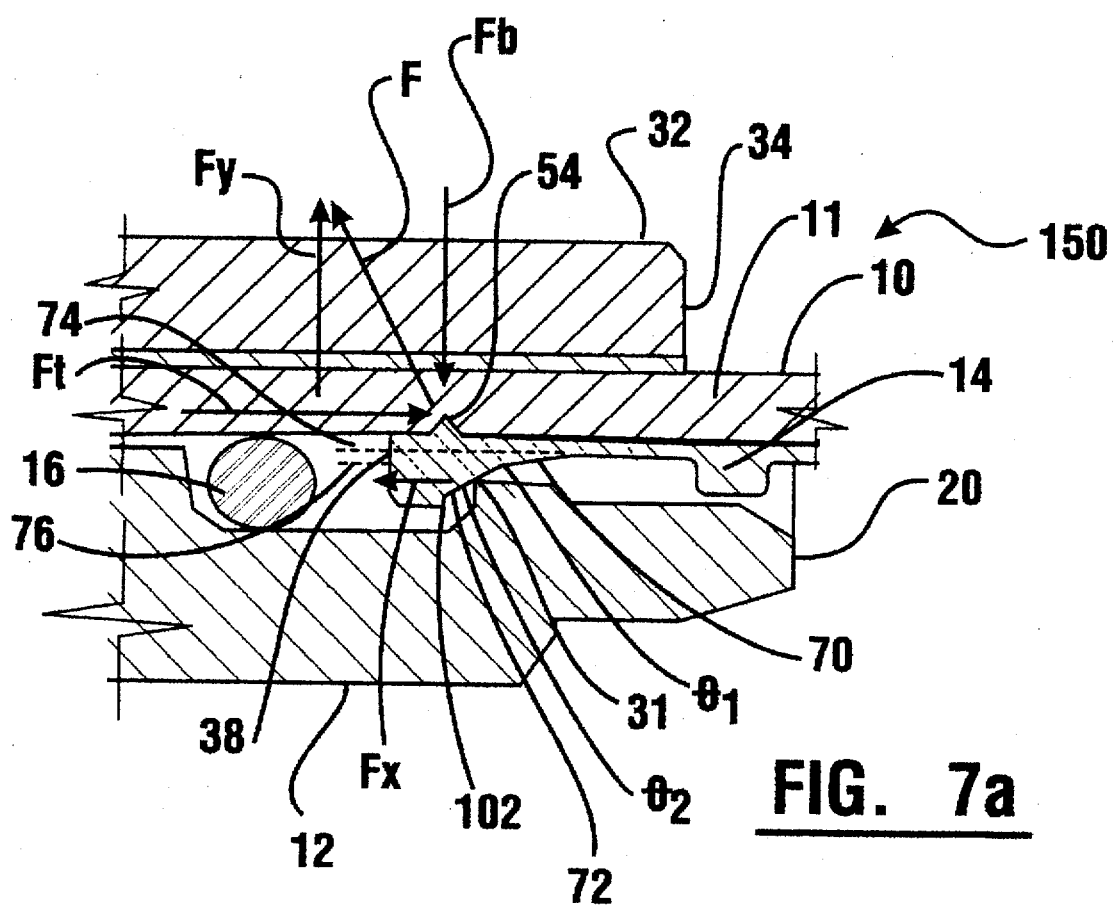
FIG. 7A is a schematic, enlarged cross-sectional view illustrating the force vectors developed by the interaction of the ramp surfaces of the collet member with the internal contact edge of the body member.
Figure 7B:
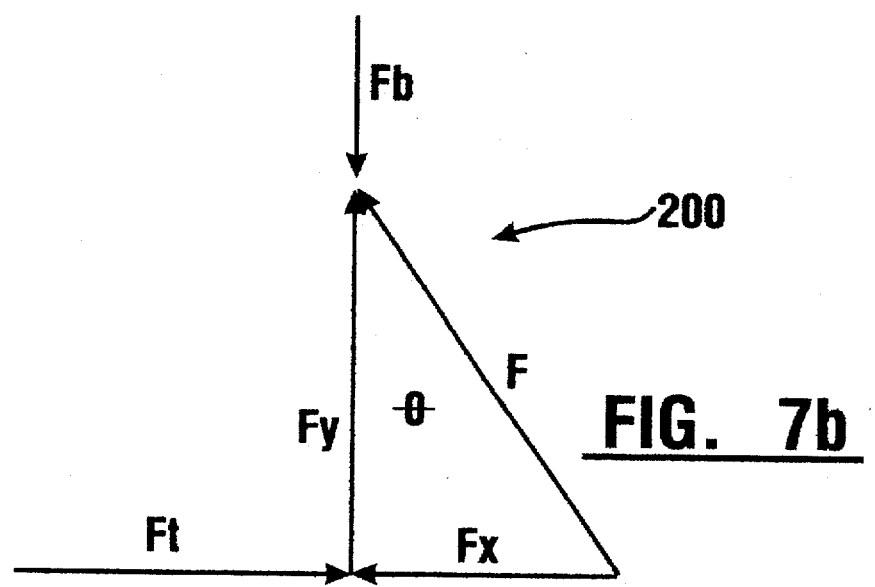
FIG. 7B is a free-body force diagram showing the resolution of the force vectors developed in FIG. 7A.

For a further appreciation of the precepts of the present invention, reference may be had to FIGS. 7A and 7B which are presented in conjunction with an analysis of the static forces developed within the fitting of the present invention. In FIG. 7A, fitting 8 is shown generally at 150 with, for the illustrative purposes of the present analysis, the first and second ramp surfaces 70 and 72 of collet member 14 defining inclination angles, $\theta_1$ and $\theta_2$, of 15° and 30°, respectively. With a forwardly-directed tensile force, referenced at $F_t$, applied to tubing 10, a corresponding force vector, referenced at $F_x$, is developed between the corresponding one of the ramp surfaces of the collet member engaging the contact edge 31 of body member 12. As is shown, vector $F_x$ may be resolved into a normal force vector, referenced at F, which is exerted on the tubing by the collet member projection 54 as directed perpendicularly to the corresponding ramp surface engaging the contact edge. Vector F, in turn, may be resolved into a vertical component, referenced at $F_y$, as the vertical force exerted on the tubing, which force has a complement, referenced at $F_b$, which is the corresponding "bite" or "grip" force exerted by the tubing.

Turning then to FIG. 7B, the forces referenced in FIG. 7A may be graphically represented by the free-body diagram shown generally at 200, with angle $\theta$ being defined between forces F and $F_y$. Summing the forces in the x- and y-directions at equilibrium, i.e., no slipping between the tubing and the collet member as when $F_t > F_x$, the following expressions may be derived:

$$F_t - F_x = 0 \quad (1)$$

$$F_b - F_y = 0 \quad (2)$$

At equilibrium, the "grip" or "bite" force developed by the tubing may be resolved according to the following expression:

$$F_b = F_y = F_x \tan\theta \quad (3)$$

Assuming a tensile force of 10 lbs, i.e., $F_t = F_x = 10$, Eq. 3 reduces to 2.68 lbs for $\theta = \theta_1 = 15°$, and 5.77 lbs for $\theta = \theta_2 = 30°$.

As more force is exerted on the tubing as the inclination angle $\theta$ is increased from 15° to 30°, a correspondingly increased force must be exerted by the tubing in order for the equilibrium of the system to be maintained. Indeed, it has been observed that the tubing is more prone to initial slipping from the fitting as the inclination angle of the first ramp surface is increased. In this regard, it is speculated that the grip edge to tubing interaction develops frictional forces which are insufficient to initially retain the tubing and allow the increased grip forces to be developed. However, it also has been observed that this increased grip force anomalously contributes to an improvement in the ultimate tensile strength, and especially the "hot pull" performance, of the fitting.

Figure 7C:
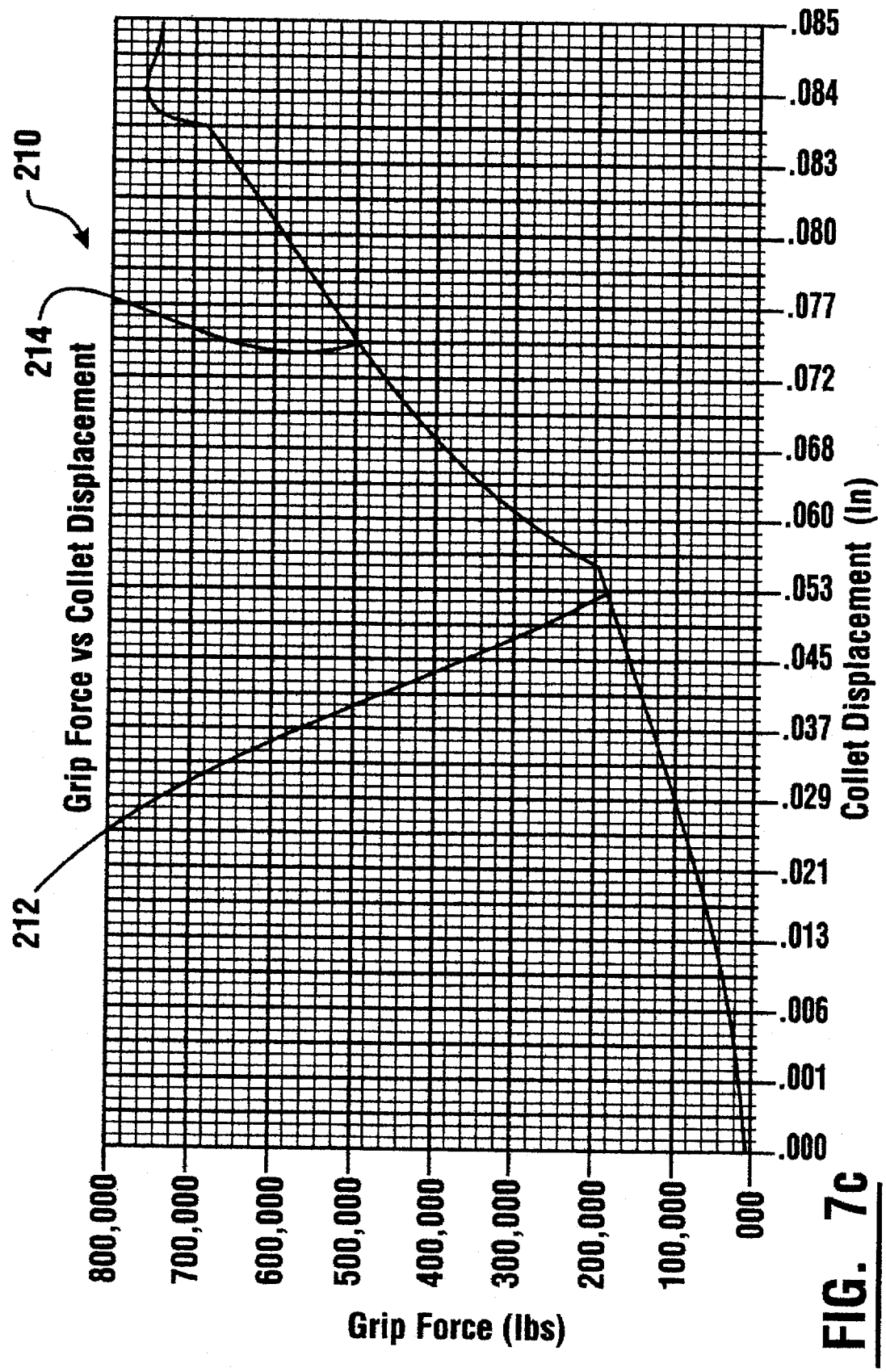
FIG. 7C is a graphical representation of the change in grip force as a function of collet displacement for the interaction between the collet member ramp surface and the body member internal contact edge illustrated in FIG. 7A.

Graphically, this anomaly is portrayed in FIG. 7C wherein grip or bite force $F_b$ is plotted at 210 as a function of collet displacement for $\theta = \theta_1 = 15°$, representing the lower portion of the curve referenced at 212, and for $\theta = \theta_2 = 30°$, representing the upper portion of the curve referenced at 214. It will be appreciated that a marked change in slope, evidencing an increased rate of force transfer, is exhibited as inclination angle $\theta$ is increased from 15° to 30° evidencing the transition from the first to the second ramp surface. Thus, it is apparent that for equilibrium to be maintained, the tubing must have a faster response time for steeper inclination angles. However, it is also apparent that for steeper inclination angles, greater ultimate grip forces are developed with less collet travel. The dual-ramp surface characteristic of the collet of the present inventions exploits this phenomenon in effecting a two-stage rate of force transfer facilitating a more gradual, initial "bite" into the tubing and, thereafter, a faster "bite" developing increased grip force with less collet travel.

The comparative example which follows is illustrative of the advantages of the present invention, but should not be construed in a limiting sense.

EXAMPLE

To confirm the precepts of the present invention, a dual-ramp, ⅜-inch (9.5 mm) push-in tube fitting constructed in accordance with the invention and various ⅜-inch (9.5 mm) tube fittings representative of the prior art were subjected to hot and cold pull tensile testing in accordance, respectively, with SAE J1131 and D.O.T. FMVSS 571.106. The testing was conducted on an Instron tensile test machine using ⅜-inch (9.5 mm) O.D., type J844 thermoplastic tubing. The following cold pull (Table 1) and hot pull (Table 2) tensile results were recorded:

TABLE 1

Cold Pull Tensile Testing

| Fitting Description | Average Load (lbs) | Average Extension (in) | Failure Mode(s) | Pass/Fail[1] |
|---|---|---|---|---|
| Dual Ramp | 255.0 | 5.652 | Tubing pulled out or bit off | Pass |
| Nycoil Polymatic ® | 185.5 | 1.380 | Tubing pulled out or bit off | Pass |
| Legris Push-Connect ™ | 177.5 | 2.266 | Tubing pulled out | Pass |
| Alkon Pneufits ™ | 217.4 | 3.221 | Tubing pulled out | Pass |
| Norgren Insta-Brass ™ | 172.1 | 1.200 | Collet pulled out | Pass |
| Parker Prestomatic ™ | 212.3 | 3.138 | Tubing bit off | Pass |

[1]Greater than 150 lbs tensile

TABLE 2

Hot Pull Tensile Testing

| Fitting Description | Average Load (lbs) | Average Extension (in) | Failure Mode(s) | Pass/Fail[1] |
|---|---|---|---|---|
| Dual Ramp | 157.0 | 5.956 |  | Pass |
| Nycoil Polymatic ® | 86.98 | 1.757 | Tubing pulled out | Fail |
| Legris Push-Connect ™ | 87.57 | 1.866 | Tubing pulled out | Fail |
| Alkon Pneufits ™ | 115.1 | 3.075 | Tubing pulled out | Fail |
| Norgren Insta-Brass ™ | 83.41 | 1.314 | Collet pulled out | Fail |
| Parker Prestomatic ™ | 179.6 | 6.722 | Tubing bit off | Pass |

[1]Greater than 150 lbs tensile or 3 in minimum extension at T = 212° F.

The results show that the "dual-ramp" fitting of the present invention advantageously passes both applicable hot and cold pull standards, and otherwise performs better or comparably to the other fittings tested as representative of the prior art. However, the fitting of the invention additionally exhibits a simplified construction with reduced collet travel.

Thus, a unique push-in fitting construction for pneumatic and other plastic tubing is described which provides for an improved tubing grip with reduced collet travel. Such construction additionally is adapted for use with existing connections, and satisfies both SAE and DOT airbrake standards.

Materials of construction for body member 12 and collet member 14 are to be considered conventional for the uses involved. Such materials generally will be corrosion resistant, but particularly will depend upon the fluid or fluids being handled. A metal material such as a mild or stainless steel or brass is preferred for durability, although other types of materials such as plastics may be substituted, however, again as selected for compatibility with the fluid being transferred or for desired mechanical properties. In this regard, the body and collet members may be forged, machined, or molded using conventional techniques.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed:

1. A fitting assembly of a variety adapted for a releasable connection with a distal tubing end of a given outer diameter, said assembly comprising:

a generally annular body member extending axially along a central longitudinal axis of said assembly from a rearward end to a forward end formed as having an internal bore with a radial surface describing an internal gland disposed intermediate said forward and said rearward end, said gland having a rearward end wall and a forward end wall defining a contact edge with said radial surface of said bore; and a collet member journalled coaxially within said bore of said body member forward end as having a generally cylindrical wall portion expandable to receive the tubing end therethrough and extending axially along said central longitudinal axis from between a forward first end of said collet member to a rearward second end defining an outer periphery of said collet member received for translational movement within said internal gland of said body member, said wall portion being longitudinally divided through the second end thereof into at least a pair of arcuate, cantilevered segments each resiliently extending between a rearward distal end and a forward proximal end disposed intermediate the first and second ends of said collet member, and each having an inner surface defining a radially-inwardly extending projection disposed generally adjacent said distal end thereof and an outer surface having a camming portion extending intermediate said proximal and distal ends from a first rearwardly-inclined ramp surface defining a first acute angle of inclination from horizontal to a generally-contiguous second rearwardly-inclined ramp surface defining a second acute angle of inclination from horizontal greater than said first acute angle, and said collet member is slidably moveable within said bore of said body member from along a rearward locus accommodating the radial outward movement of said segments resiliently expanding said wall portion for the insertion and removal of the tubing end through said collet member and, respectively, first and second forward loci operatively disposing said first ramp surface of said collet member segments in abutting, force-transmitting engagement with said contact edge of said body member transferring a radially inwardly directed normal force component to said segment projections at a first predetermined rate gripping the outer diameter of the tubing between said segments delimiting the removal of the tubing end from said fitting assembly, and disposing said second ramp surface of said collet member segments in abutting, force-transmitting engagement with said contact edge of said body member transferring a radially inwardly directed normal force component to said segment projections at a second predetermined rate increased over said first predetermined rate further gripping the outer diameter of the tubing between said segments.

2. The assembly of claim 1 wherein said first ramp surface of said collet defines an acute angle of at least about 15° from horizontal and said second ramp surface of said collet member defines an acute angle of at least about 30° from horizontal.

3. The assembly of claim 1 wherein said first ramp surface of said collet member defines an acute angle of about 15° from horizontal and said second ramp surface of said collet member defines an acute angle of about 30° from horizontal.

4. The assembly of claim 1 wherein said camming portion of each said collet member segment further extends rearwardly from said second ramp surface to define a generally upstanding stop portion abuttingly engagable with said contact edge of said body member delimiting the further forward movement of collet member within said bore of said body member.

5. The assembly of claim 1 wherein said collet member wall portion is formed as having at least a pair of rebates each extending through said collet member second end for defining said collet member segments.

6. The assembly of claim 5 wherein said rebates are equally spaced-apart radially about said longitudinal axis to divide said collet member into at least a pair of equal circumferential segments.

7. The assembly of claim 1 wherein said collet member is divided into at least a pair of equal circumferential segments.

8. The assembly of claim 1 further comprising a resilient, generally annular seal member disposed coaxially within said body member gland as interposed between the rearward end wall thereof and said second end of said collet member, said seal member being configured to receive the tubing end therethrough for effecting a fluid-tight sealing engagement between the tubing diameter and said gland.

9. The assembly of claim 1 wherein said body member rearward end is threaded.

10. A fitting of a variety adapted for a releasable connection with a distal tubing end of a given outer diameter, said fitting comprising:

a generally annular body member extending axially along a central longitudinal axis of said fitting from a rearward end to a forward end formed as having an internal bore with a radial surface describing an internal gland disposed intermediate said forward end and said rearward end, said gland having a rearward end wall and a forward end wall defining a contact edge with said radial surface of said bore; and a collet member having a generally cylindrical wall portion expandable to receive the tubing end therethrough and extending axially along said central longitudinal axis from between a forward first end of said collet member to a rearward second end defining an outer periphery of said collet member receivable for translational movement within said internal gland of said body member, said wall portion being longitudinally divided through the second end thereof, said wall portion being longitudinally divided through the second end thereof into at least a pair of arcuate, cantilevered segments each resiliently extending between a rearward distal end and a forward proximal end disposed intermediate the first and second ends of said collet member, and each having an inner surface defining a radially-inwardly extending projection disposed generally adjacent said distal end thereof and an outer surface having a camming portion extending intermediate said proximal and distal ends from a first rearwardly-inclined ramp surface defining a first acute angle from horizontal to a generally-contiguous second rearwardly-inclined ramp surface defining a second acute angle from horizontal greater than said first acute angle, and said collet member is journalable coaxially within said bore of said body member forward end disposing said collet member second end within said body member internal gland, said collet member being slidably movable within said bore therewithin from along a rearward position accommodating the radial outward movement of said segments resiliently expanding said wall portion for the insertion and removal of the tubing distal end through said collet member and, respectively, first and second rearward positions for operatively disposing said first ramp surface in abutting, force-transmitting engagement with said contact edge of said body member for transferring a first radially inwardly directed normal force component to said segment projections at a first predetermined rate effective for gripping the outer diameter of the tubing between said segments and delimiting the removal of the tubing end from said body member, and for disposing said second ramp surface in an abutting, force-transmitting engagement with said contact edge of said body member applying a second radially inwardly directed normal force component to said segment projections at a second predetermined rate effective for further gripping the outer diameter of the tubing between said segments.

11. The fitting of claim 10 wherein said first ramp surface of said collet member defines an acute angle of at least about 15° from horizontal and said second ramp surface of said collet member defines an acute angle of at least about 30° from horizontal.

12. The fitting of claim 10 wherein said first ramp surface of said collet member defines an acute angle of about 15° from horizontal and said second ramp surface of said collet member defines an acute angle of about 30° from horizontal.

13. The fitting of claim 10 wherein said damming portion of each said collet member segment further extends rearwardly from said second ramp surface to define a generally upstanding stop portion abuttingly engagable with said contact edge of said body member delimiting the further forward movement of collet member within said bore of said body member.

14. The fitting of claim 10 wherein said collet member wail portion is formed as having at least a pair of rebates each extending through said collet member second end for defining said collet member segments.

15. The fitting of claim 14 wherein said rebates are equally spaced-apart radially about said longitudinal axis to divide said collet member into at least a pair of equal circumferential segments.

16. The fitting of claim 10 wherein said collet member is divided into at least a pair of equal circumferential segments.

17. The fitting of claim 10 further comprising a resilient, generally annular seal member disposed coaxially within said body member gland as interposed between the rearward end wall thereof and said second end of said collet member, said seal member being configured to receive the tubing end therethrough effecting a fluid-tight sealing engagement between the tubing diameter and said gland.

18. The fitting of claim 10 wherein said body member rearward end is threaded.

* * * * *